Figure 1:
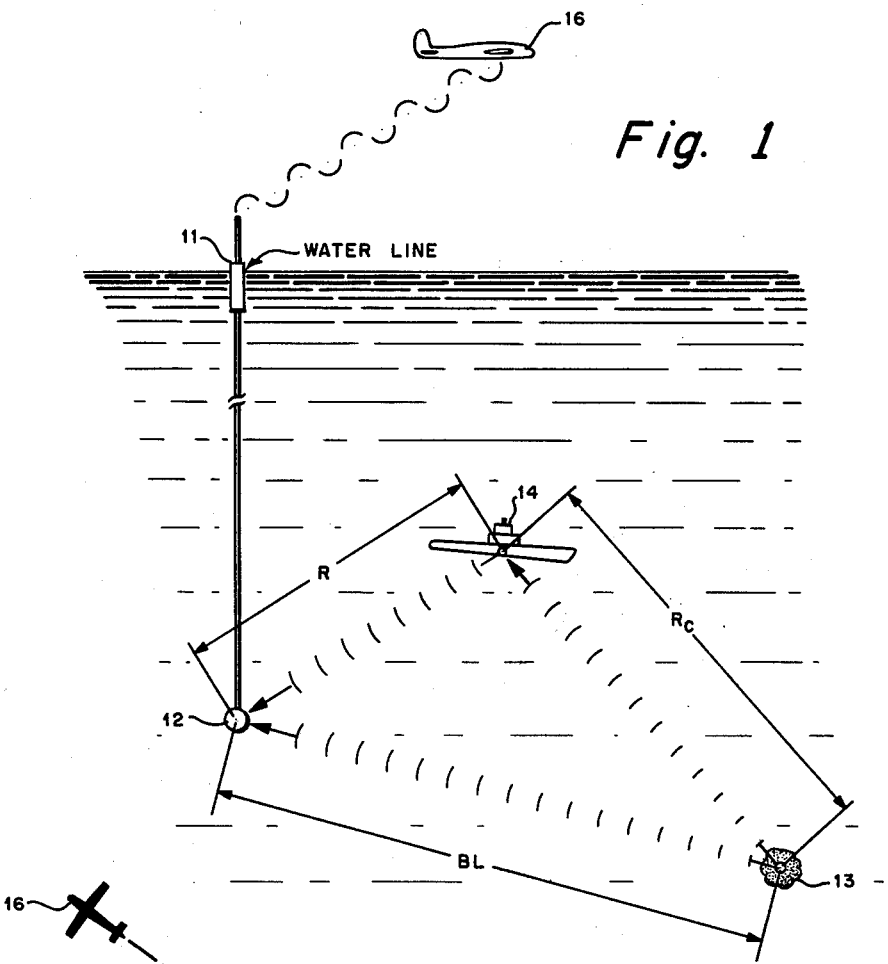

Dec. 8, 1964  W. R. GUSTAFSON ETAL  3,160,846
ELLIPTICAL COMPUTER
Filed Nov. 3, 1961  4 Sheets-Sheet 1

INVENTORS
WALTER R. GUSTAFSON
WILLIAM H. McMILLEN
JAMES R. ROUNDING, JR.
LEO SHORE
BY
ATTORNEY

Dec. 8, 1964   W. R. GUSTAFSON ETAL   3,160,846
ELLIPTICAL COMPUTER
Filed Nov. 3, 1961   4 Sheets-Sheet 4

INVENTORS
WALTER R. GUSTAFSON
WILLIAM H. McMILLEN
BY   JAMES R. ROUNDING, JR.
LEO SHORE

ATTORNEY

United States Patent Office 3,160,846
Patented Dec. 8, 1964

3,160,846
ELLIPTICAL COMPUTER
Walter R. Gustafson, Furlong, William H. McMillen, Levittown, James R. Rounding, Jr., Doylestown, and Leo Shore, Abington, Pa., assignors to the United States of America as represented by the Secretary of the Navy
Filed Nov. 3, 1961, Ser. No. 150,102
11 Claims. (Cl. 340—3)
(Granted under Title 35, U.S. Code (1952), sec. 266)

The invention described herein may be manufactured and used by or for the Government of the United States of America for governmental purposes without the payment of any royalties thereon or therefor.

The present invention relates to an elliptical computer and more particularly to an elliptical computer of the analog type operative to process data received from explosive echo ranging systems for application to an airborne integrated display system installed in an anti-submarine warfare aircraft.

Explosive echo ranging techniques have been developed employing air dropped sonobuoys and explosive charges to aid in the detection and localization of submarine targets whereby an attack upon the target may be accomplished. Apparatus in the sonobuoys is operative to convert elastic waves generated by the explosive charges and impinging upon the sonobuoys to radio frequency signals which are transmitted to appropriate receiving systems installed in the aircraft. The received signals are recorded on a moving strip charge recorder which is coupled to the receiving systems to thereby provide a visual display of sonobuoy signals. When a submarine target is in the vicinity of the sonobuoys, a portion of the energy from the explosive charges is reflected from the target and likewise impinges upon the sonobuoys so that both direct and echo sonobuoy signals are displayed upon the moving strip chart and are displaced from each other thereon in proportion to the time intervals which elapse between receipt of direct and echo waves at the sonobuoys. By dropping patterns consisting of two sonobuoys and a single charge, deposited adjacent one of the sonobuoys, or a single sonobuoy with one charge deposited adjacent the sonobuoy and a second charge deposited at a known distance therefrom, direct and echo signals may be recorded upon the moving strip chart wherein the displacements between the recorded signals are proportional to the radii of intersecting circles having the sonobuoys or a sonobuoy and a charge as centers thereof and having the target located at one of the circle intersections. Apparatus may be associated with the moving strip chart recorder whereby voltages proportional to the circle radii may be provided and coupled to indicating devices such as digital counters. The data provided by the counters may be employed to construct a target plot from which the target track with respect to the anti-submarine warfare aircraft may be determined.

While providing a good area coverage in a given period of time, the circle solution of the localization problem, described above, is characterized by several disadvantages. For example, not only does the circle solution require excessive utilization of sonobuoys and explosive charges, but, since in order to obtain accurate range data it is necessary that the distance between the sonobuoys or between the sonobuoy and the remotely deposited charge be accurately known, it is necessary that the anti-submarine warfare aircraft be flown over the sonobuoy or one of the sonobuoys and be directed along a selected track a known distance before depositing the second sonobuoy or the second charge each time a sonobuoy signal recording is to be obtained.

The development of the airborne integrated display system disclosed in co-pending application Serial No. 137,943 of Walter R. Gustafson et al. for Airborne Integrated Display System, filed September 8, 1961, provided computing, storage, and display means whereby the relative locations of sonobuoys, explosive charges, and the antisubmarine warfare aircraft could be accurately determined and displayed. The present invention was developed in order to fully exploit the capabilities of the airborne integrated display system in the detection and localization of submarine targets using explosive echo ranging techniques.

Briefly, there is provided by the invention a computer of the analog type that is compatible with the airborne integrated display system mentioned above and which is operable upon the variables available from existing sonobuoy receiving systems and data conversion units to implement an elliptical equation in rho-theta form with respect to one focus of an ellipse.

Physically, the ellipse is defined by having a sonobuoy as one focus thereof and an offset explosive charge as the other focus. Localization is accomplished by generating two or more intersecting ellipses having a single sonobuoy as a common focus and having the submarine target located at one of the ellipse intersections.

In practicing the elliptical solution to the localization problem with the present invention in connection with the integrated display system, the sonobuoys and explosive charges may be deposited in a random pattern since the relative positions of offset charges may be accurately determined by utilizing the airborne integrated display system mentioned above. For a given area of solution, the time required for the localization process is greatly reduced thus enhancing the prospects of success in coping with high speed targets. However, since greater area coverage may be obtained employing circle solution techniques in contrast to elliptical solutions, the capability of functioning to provide circle solutions is retained in the present invention.

Accordingly, it is an object of the present invention to provide a computer whereby elliptical solutions of submarine target detection and localization problems may be accomplished.

It is another and more specific object of the present invention to provide an elliptical computer operable upon data provided by existing sonobuoy receiving and data processing systems and compatible with airborne integrated display systems.

Figure 2:
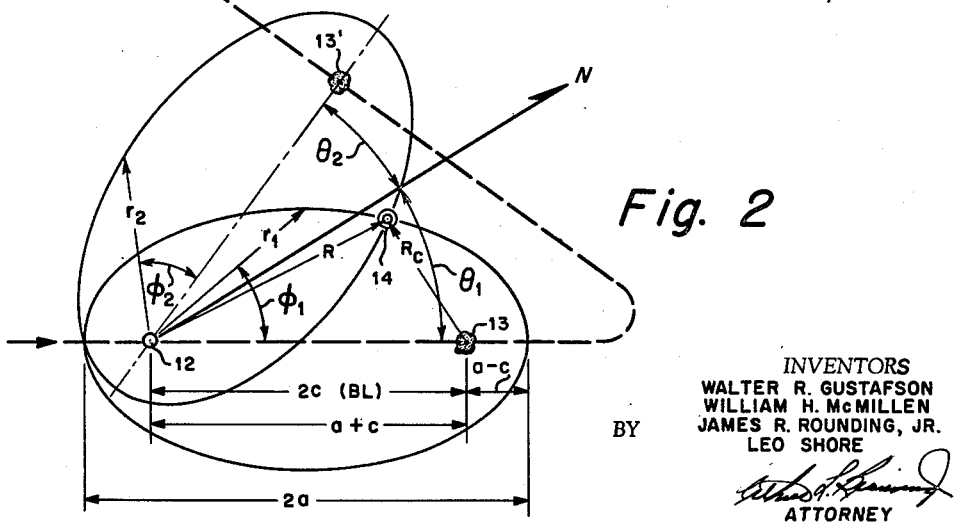
Figure 3:
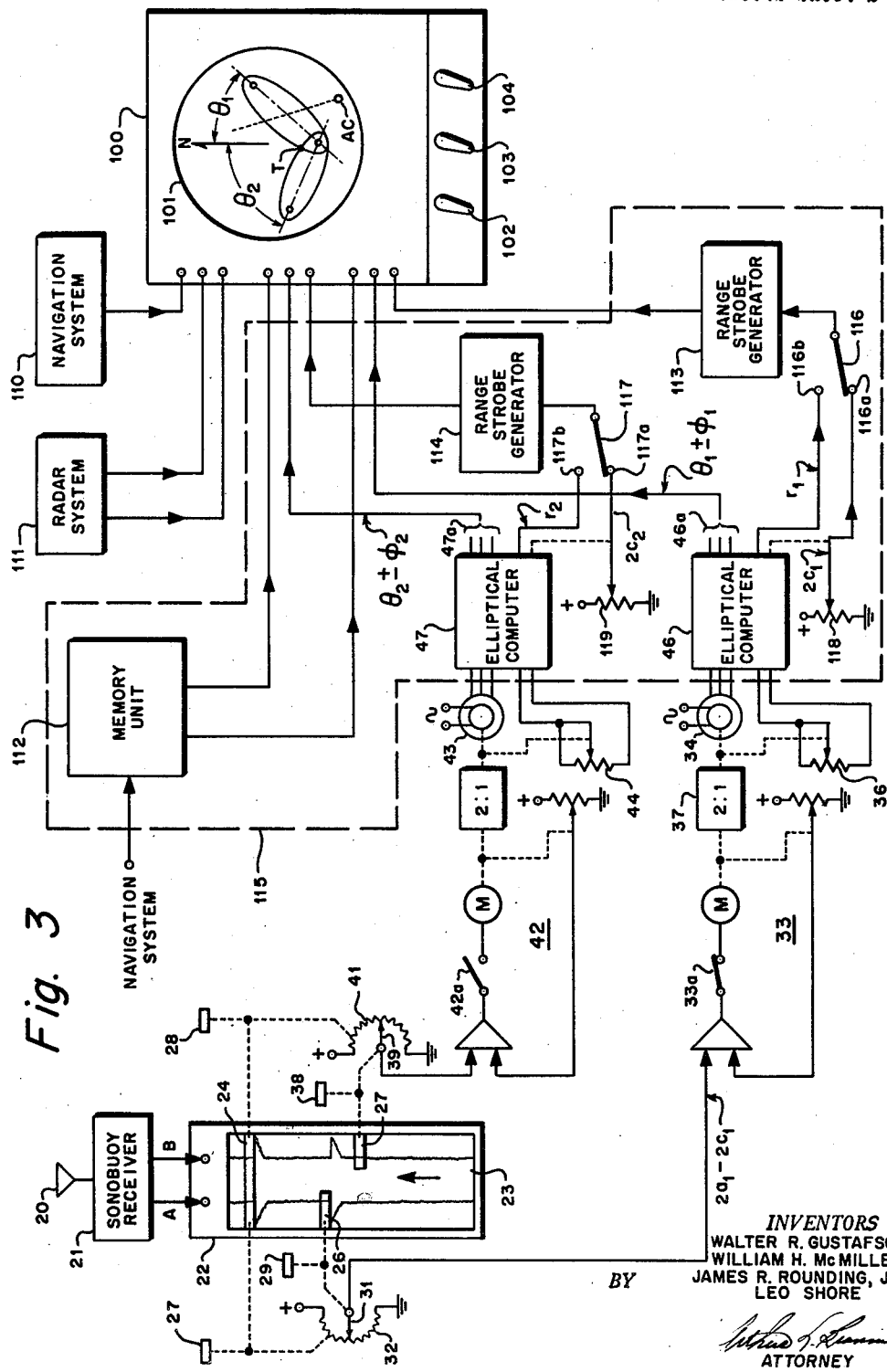
Figure 4:
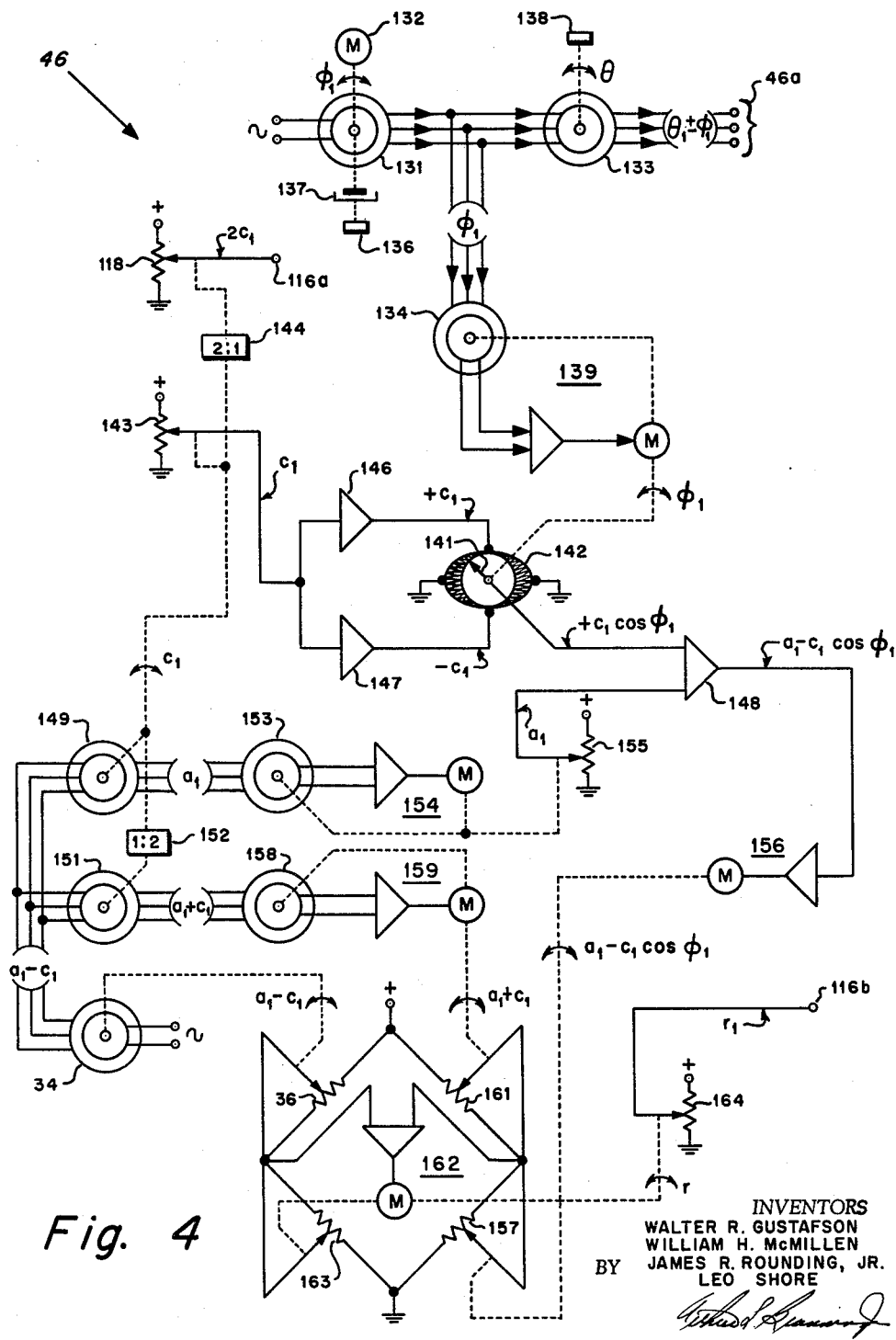
Figure 5A:
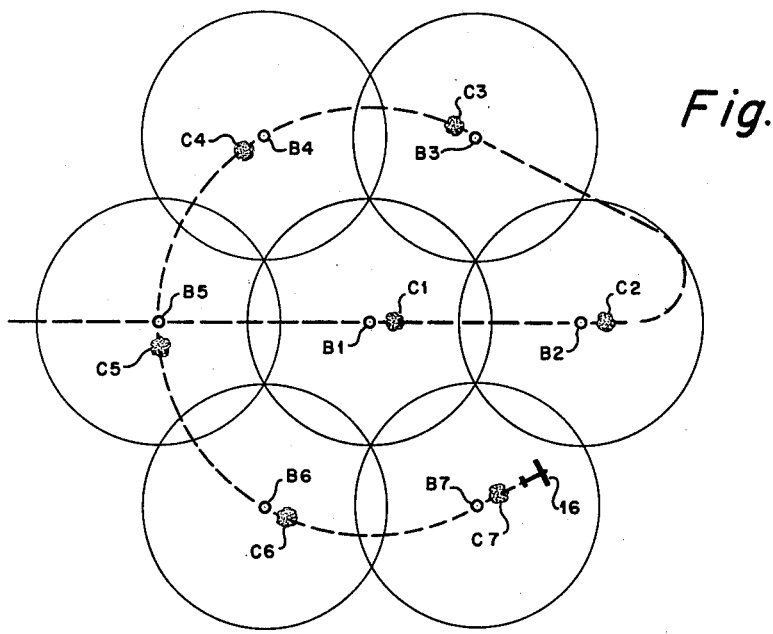
Figure 5B:
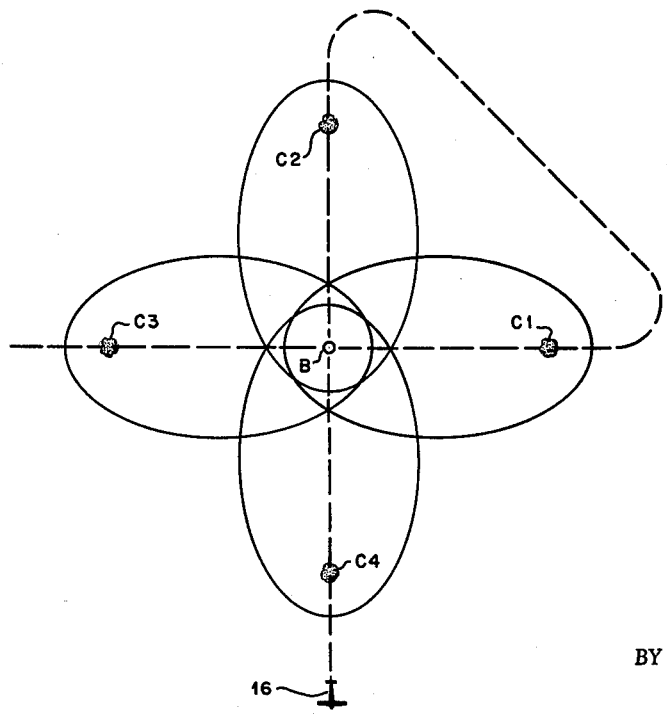

Other objects and many of the attendant advantages of this invention will be readily appreciated as the same becomes better understood by reference to the following detailed description when considered in connection with the accompanying drawings wherein:

FIG. 1 schematically illustrates the principles of explosive echo ranging as employed in airborne anti-submarine warfare;

FIG. 2 illustrates a simplified elliptical solution to the submarine target localization problem wherein the parameters upon which the present invention is operable as well as the data made available by operation thereof are geometrically shown;

FIG. 3 in block diagram form indicates the manner in which the computer of the present invention may be associated with a sonobuoy receiving and data processing system and with an airborne integrated display system; and FIG. 4 partly in circuit diagram and partly in schematic form illustrates one of the elliptical computers shown in block diagram form in FIG. 3; and FIGS. 5a, 5b schematically illustrate the comparative areas of coverage and areas of solution respectively provided by circular and elliptical solutions.

Referring now to FIG. 1, there is shown a sonobuoy transmitter 11 having a hydrophone 12 suspended therefrom and an explosive charge 13 which has been deposited a known distance, termed the base line (BL), from the sonobuoy. A portion of the elastic waves generated by the explosive charge impinges directly upon hydrophone 12 while another portion is reflected from a submarine target 14 to impinge upon hydrophone 12 sometime after the direct wave. Apparatus in sonobuoy transmitter 11 functions to convert the hydrophone signals to radio frequency signals which are transmitted to an anti-submarine warfare aircraft 16 where they are received by a sonobuoy receiver 21 (FIG. 4) mounted in aircraft 16. The range between hydrophone 12 and target 14 is designated in FIG. 1 by the reference letter R while the distance between the target and explosive charge 13 is designated by the reference letter $R_c$.

By inspection of FIG. 1 it will be apparent that the time interval which elapses between receipt of the direct and echo waves at hydrophone 12 is proportional to: $R+R_c-BL$. By conjoint reference to FIG. 1, and FIG. 2 it will be seen that if hydrophone 12 and explosive charge 13 are considered to comprise the foci of an ellipse passing through target 14, the base line, BL, is equivalent to $2c$, the distance between foci, while the sum of R and $R_c$ is equivalent to $2a$, the length of the major axis (since the length of the major axis is equal to the sum of the distances between the foci and any point on the ellipse).

The equation of an ellipse in polar form with respect to one focus thereof is:

$$r = \frac{(a+c)(a-c)}{a-c \cos \phi}$$

where $r$ is the distance between the focus and any point on the ellipse, and $\phi$ is the angle between the major axis and any point on the ellipse ($a$ and $c$ are respectively equal to one-half the length of the major axis and one-half the distance between foci).

Thus, as indicated in FIG. 2 and as will be hereinafter more fully explained by reference to FIGS. 3 and 4, after dropping a sonobuoy 12 and a plurality of explosive charges 13, 13', etc., the time intervals which elapse between receipt of direct and echo waves at sonobuoy 12 may be utilized to obtain data defining a plurality of ellipses having sonobuoy 12 as a common focus and intersecting at the location of target 14.

Referring now to FIG. 3, sonobuoy signals broadcast by sonobuoy transmitter 11 are received on an antenna 20 and are coupled to the input circuits of a sonobuoy receiver 21, the output circuits of which are coupled to pen actuating mechanisms (not shown) of a plural channel moving strip chart recorder 22. Since only one sonobuoy is used in practicing the present invention, the channels of sonobuoy receiver 21 are all tuned to the same sonobuoy frequency and the recording on the moving strip chart of the received sonobuoy signals will be symmetrical on all channels thereof.

Chart recorder 22 is provided with a plurality of mechanical cursors which are mounted for sliding movement with respect to a moving strip chart 23. The cursors are herein designated direct cursor 24 and echo cursors 26, 27. By manipulation of knobs 27, 28, and knob 29, direct cursor 24 and echo cursor 26 may be positioned with respect to sonobuoy signals recorded on one channel of recorder 22 whereby a voltage is obtained at wiper arm 31 of a potentiometer 32 that is proportional to the time interval which elapses between receipt of direct and echo waves at hydrophone 12 from explosive charge 13 or, in terms of the elliptical parameters discussed above, that is proportional to $2a_1-2c_1$ where the subscript one denotes parameters associated with the ellipse having hydrophone 12 and explosive charge 13 as foci thereof. The voltage appearing at wiper arm 31 is employed to energize a servo system 33, of a conventional type, whereby the stator of a synchro transmitter 34 and the wiper arm of a precision potentiometer 36 are positioned in accordance with the difference between $a_1$ and $c_1$, division by two being provided, for example, by a reduction gear means 37.

In like manner, by manipulation of knobs 27, 28, and knob 38, direct cursor 24 and echo cursor 27 may be positioned with respect to the direct and echo signals received at sonobuoy 12 from explosive charge 13' to provide a voltage at wiper arm 39 of a potentiometer 41 that is proportional to $2a_2-2c_2$, where the subscript two denotes the parameters of the ellipse having sonobuoy 12 and explosive charge 13' as foci. The voltage appearing at wiper arm 39 is employed to energize a second servo system 42, in all respects similar to servo system 33, whereby the stator of a synchro transmitter 43 and the wiper arm of a precision potentiometer 44 are positioned in accordance with the difference between $a_2$ and $c_2$.

Since, in order to obtain a voltage proportional to the parameters of the second or subsequent ellipses, it is necessary to disturb the setting of direct cursor 24, servo systems 33, 42 may be provided with switching means 33a, 42a in order to permit locking up of the first energized servo system to thereby permit storage of elliptical data.

As will be more fully explained in connection with FIG. 4, elliptical computers 46, 47 (which may comprise a single two channel computer) are operable when energized by signals proportional to $a-c$, and $c$, respectively, to provide output signals proportional to $\phi$, and $r$ as a function of $\phi$, respectively. Signals proportional to $a-c$ are obtained from synchro transmitters 34, 43 and from precision potentiometers 36, 44, respectively, while, as will be explained below, signals proportional to $c$ may be obtained from the airborne integrated display system, mentioned above, a portion which is shown in FIG. 3. Alternately, the potentiometers may be manually positioned in accordance with the distance $c_1$ and $c_2$ which are known or easily calculated.

The principal display element of the airborne integrated display system comprises an electronic plotter 100 including a cathode ray tube indicator 101. Electronic plotter 100 includes means whereby three independently controllable cursors may be generated and displayed on the face of the cathode ray tube indicator.

The origin control for cursor number one (indicated by dotted lines in FIG. 3) is coupled to a navigation system 110 while the video control circuitry therefor is normally coupled to a radar system 111 whereby the cursor is operable to generate a ground stabilized plan position indication on cathode ray tube indicator 101 having the present position of the anti-submarine warfare aircraft designated by the origin of the display.

Origin slew control means are provided for electronic plotter 100 and are indicated by control levers 102, 103 and 104 in FIG. 3. However, in the present use of plotter 100, the origin controls for cursors number two and three (shown in FIG. 3 as comprising the major axes of a pair of ellipses) are normally coupled to the output circuits of a memory unit 112, the input circuits of which are coupled to navigation system 110. In operating the airborne integrated display system, the position of the aircraft at the time of sonobuoy or explosive charge drop is stored in memory unit 112. Accordingly, by proper operation of the readout controls for memory unit 112 (not shown) the origins of cursors two and three may be positioned adjacent the relative positions of sonobuoys and explosive charges with respect to the aircraft, and, in practicing the present invention, are mutually positioned in accordance with the location of sonobuoy 12 with respect to the present position of the aircraft.

Rotational voltages for cursors one and two are normally provided by azimuth signal generators (not shown), however, in practicing the present invention rotational voltages are provided by elliptical computers 46, 47 at terminals 46a, 47a, respectively.

Each of the cursors one, two, and three are provided with range strobe generators of the phantastron delay type which are coupled to the video control circuits of cathode ray tube indicator 101 whereby a positionable bright spot is generated and located upon the cursors. Two of the range strobe generators are shown in FIG. 3 and numbered 113, 114.

It should be noted that electronic plotter 100, cathode ray tube indicator 101, range strobe generators 113 and 114, and origin slew control means 102, 103 and 104 may be of the type described in an unclassified publication, NAVAER 16–30 APA 125, entitled "Handbook of Service Instructions," published September 1, 1959.

Navigation system 110 is conventional and is used to provide the input to the origin control for cursor number one to provide an indication of the present position of the aircraft on cathode ray tube indicator 101. Radar system 111 is coupled to the video circuitry of indicator 101, for which the indicator in the above-mentioned publication was designed to handle.

In order to facilitate comparison of the above brief description with the more complete disclosure of the airborne integrated display system set forth in the above referenced copending application Serial No. 137,943, it is noted that the elements enclosed within dotted lines and indicated by the reference numeral 115 in FIG. 3 comprise portions of the data display group which forms a major component of the integrated display system. The radar system, navigation system, and electronic plotter are similarly designated in the referenced application.

If the origin of one of the cursors is positioned adjacent one feature displayed on electronic plotter 100 and the range strobe on the cursor is positioned adjacent a second feature thereon, it will be apparent that the control voltage (or control resistance) applied to the associated range strobe generator will be a measure of the range between the two features. Accordingly, in order to obtain a voltage for application to elliptical computers 46, 47 proportional to $2c_1$ or $2c_2$, respectively the distances between sonobuoy 12 and explosive charges 13 and 13', it is only necessary to position the origin of cursors two and three adjacent the location of sonobuoy 12 and to position the range strobes thereon adjacent the positions of explosive charges 13, 13'. In practicing the invention, the necessary control voltages (or control resistances, as the case may be) for range strobe generators 113, 114 are provided by potentiometers 118, 119 which are coupled through switching means 116, 117 to the range strobe generators.

One embodiment of elliptical computers 46, 47 is shown in FIG. 4 wherein elliptical computer 46 has been selected for example. In order to permit correlation of the showing of FIG. 4 with that of FIG. 3, synchro transmitter 34, precision potentiometer 36, potentiometer 118, and switching means terminals 116a and 116b are shown and designated by the same reference numerals in FIG. 4.

Referring now to FIG. 4, as mentioned above, elliptical computers 46, 47 when provided with inputs proportional to $a-c$, and $c$, function to provide rotational voltages for application to electronic plotter 100 that are proportional to $\theta \pm \phi$, and voltages for application to range strobe generators 113, 114 that are proportional to $r$ as a function of $\phi$ (where $r$ is the distance between one focus of the ellipse and any point thereon, and $\phi$ is the angle between the major axis of the ellipse and the point thereon).

Before proceeding further with a description of FIG. 4, by reference to FIGS. 2 and 3, it will be noted that $\theta$ is the angle which defines the orientation of the major axis of each ellipse with respect to a reference direction, for example North. Stated in other terms, $\theta_1$ and $\theta_2$ respectively define the orientation of lines passing through sonobuoy 12 and explosive charges 13, 13' with respect to the reference direction. The localization ellipses are therefore displayed upon cathode ray tube indicator 101 in proper orientation with respect to the remainder of the display appearing thereon.

Referring now again to FIG. 4, the required rotational voltage is provided by a synchro transmitter 131 having the rotor thereof mechanically coupled to a motor 132 to be continuously rotated thereby and the stator thereof coupled to a differential synchro 133 and a control transformer 134. In order to establish orientation of the ellipse in accordance with the angle $\theta$, the rotor of synchro transmitter 131 is set to a zero position by operation of a knob 136 which is coupled through a clutch 137 to the rotor of the synchro transmitter. The rotor of differential synchro 133 is then rotated by a knob 138 until the associated cursor being displayed upon cathode ray tube indicator 101 is rotated to proper orientation. Thereafter the cursor is rotated in response to the voltages provided by synchro transmitter 131 with respect to the initial orientation thereof and a servo system 139 energized by control transformer 134 functions to position the wiper arm 141 of a cosine potentiometer 142 in accordance with the angle $\phi$.

Since the wiper arm of potentiometer 118 has been positioned in accordance with the magnitude of $2c$, the wiper arm of a potentiometer 143 which is mechanically coupled thereto is positioned to select a voltage proportional to $c$, division by two being provided by appropriate gearing, as indicated by gear means 144, or by proportioning the voltage applied to potentiometer 143, for example. The voltage appearing on the wiper arm of potentiometer 143 is coupled to a pair of amplifiers 146, 147 to thereby provide voltages respectively proportional to $\pm c$ which are applied to cosine potentiometer 142.

Thus, a voltage is provided at wiper 141 proportional to $c$ cosine $\phi$ which is applied as one input to a differential amplifier 148.

As mentioned above in connection with the description in FIG. 3, synchro transmitter 34 provides a voltage proportional to $a-c$, and, as indicated in FIG. 4, the voltage is conjointly coupled to a pair of differential synchros 149, 151, the rotors of which are mechanically coupled to the wiper of potentiometer 118. The mechanical coupling to the rotor of differential synchro 151 may include a gear means 152 whereby the rotor of differential synchro 151 rotates twice for each rotation of the rotor of differential synchro 149.

The output signal from differential synchro 149, proportional to $a$, is coupled through a control transformer 153 to energize a servo system 154 which functions to position the wiper arm of a potentiometer 155 in accordance with the value of $a$.

The voltage appearing at the wiper arm of potentiometer 155 is coupled as the other input to differential amplifier 148 whereby an output voltage therefrom is provided which is proportional to $a-c \cos \phi$. Differenital amplifier 148 provides an energizing voltage to a servo system 156 which functions to position the wiper arm of a potentiometer 157 in accordance with the value of $a-c \cos \phi$. The output voltage from differential synchro generator 151, proportional to $a+c$, is applied to a control transformer 158, the output voltage from which energizes a servo system 159 which functions to position the wiper arm of a potentiometer 161 in accordance with the value of $a+c$.

It will be recalled from the description of FIG. 3 above, that the wiper arm of potentiometer 36 is positioned in accordance with $a-c$. Since potentiometers 36, 157, and 161 comprise the arms of a Wheatstone bridge, the voltage appearing across the balance points thereof and coupled to a servo system 162 is proportional to $r$ as a function of $\phi$ in accordance with the elliptical equation set forth above. Accordingly, the wiper arm of potentiometer 163, which comprises the remaining arm of the bridge, and the wiper arm of a potentiometer 164 are conjointly positioned in accordance with the magnitude of $r$ as a function of $\phi$.

The voltage appearing at the wiper arm of potentiometer 164 is coupled to terminal 116b of switching means 116 for application to range strobe generator 113 which functions to position the range strobe on the associated cursor.

From the above description, it will be apparent that the cursor rotational voltages and range strobe voltages applied to electronic plotter 100 cause the associated cursors to generate ellipses upon the screen of cathode ray tube indicator 101 having the locations of sonobuoy 12 and explosive charges 13, 13' as foci. The location of the target (range and bearing) may be determined by applying appropriate control voltages to cursor number one, the origin of which represents the present position of the anti-submarine warfare aircraft.

By reference to FIGS. 5a, 5b it may be seen that the circular solution illustrated in FIG. 5a provides somewhat better area coverage than the elliptical solution shown in FIG. 5b, although the elliptical solution provides a somewhat greater area of solution. Accordingly, during the search phase, notwithstanding the greater expenditure of sonobuoys and charges required, it may be desirable to employ circular solutions. For this reason, as will be understood by conjoint reference to FIGS. 3, 4, and 5a, the capability of generating and displaying circular solutions upon the screen of cathode ray tube indicator 101 is included in the present invention.

By reference to FIG. 5a, it will be noted that the time interval between receipt of direct and echo waves at the air dropped sonobuoys is proportional to twice the radius of a circle passing through a target. Thus, referring to FIG. 3, the direct and echo cursors of recorder 22 may be positioned to provide voltages for application to servo systems 33, 42, whereby synchro transmitters 34, 43 and the wipers of resistors 36, 44 are positioned in accordance with the radii of circles having sonobuoys as centers and passing through the target location. Since in the circle solution case $c$ is equal to zero, computers 46, 47 function to provide control voltages for application to range strobe generators 113, 114 which are at all times equal to the circle radii while, at the same time, the synchro transmitters in the computers provide rotational voltages for application to electronic plotter 100. In this case $a=r$, the circle radius. Thus, control voltages are applied to electronic plotter 100 whereby cursors two and three generate intersecting circles on the screen of cathode ray tube indicator 101 having the target located at one of the circle intersections.

Of course, since much of the components of computers 46 and 47 are unneeded when employed to provide circle solution, switching means (not shown) may be provided whereby only the rotational voltages provided by the computers are used. In this event, range strobe control voltages may be obtained directly from servo systems 33, 42.

There has been disclosed above apparatus and systems whereby elliptical and circular solutions to submarine target detection and localization problems may be obtained and displayed upon an electronic plotter using data obtained from sonobuoys and explosive charges airdropped from an anti-submarine warfare aircraft while traversing an optimum flight path, and wherein expenditures of sonobuoys and charges may be minimized.

It should be understood of course that the foregoing disclosure relates to only a preferred embodiment of the invention and that numerous modifications or alterations may be made therein without departing from the spirit and the scope of the invention as set forth in the appended claims.

Having thus described the invention, what is claimed is:

1. Apparatus for use in airborne anti-submarine warfare comprising: electronic plotter means comprising, a cathode ray tube system operative to independently generate and display a plurality of rotatable cursors, each provided with a range strobe, on the screen of a cathode ray tube, said plotter including cursor origin, bearing, and range strobe control means, and a plurality of cursor range strobe signal generating means adapted to be coupled to said cursor range strobe control means; means to apply signals proportional to the relative locations of a plurality of air-dropped sonobuoys and explosive charges to said cursor origin control means; means operative to provide signals proportional to the elapsed time between receipt of direct and echo signals at said sonobuoys from said air dropped explosive charges; means energized by the signals provided by said last mentioned means and operative in response thereto to provide rotational voltages coupled to said cursor bearing control means and control signals coupled to said range strobe signal generating means.

2. Apparatus for use in airborne anti-submarine warfare comprising: electronic plotter means comprising, a cathode ray tube system operative to independently generate and display a plurality of rotatable cursors, each provided with range strobes, on the screen of a cathode ray tube and including cursor origin, bearing, and range strobe control means, and a plurality of cursor range strobe signal generating means adapted to be coupled to said cursor range strobe control means; means to apply signals proportional to the relative locations of a plurality of air-dropped sonobuoys and explosive charges to said cursor origin control means; means operative to generate signals proportional to the elapsed time between receipt of direct and echo signals at a selected sonobuoy from an explosive charge, said elapsed time being herein designated $2a-2c$; means coupled to said electronic plotter operative to provide a signal proportional to the distance between a selected sonobuoy and a selected charge, said distance being herein designated $2c$; elliptical computing means including means operative to provide a rotational signal, herein designated $\phi$; said elliptical computing means coupled to be energized by said signals proportional to $2a-2c$, $2c$, and $\phi$ operative to provide a signal proportional to $$r = \frac{(a-c)(a+c)}{a-c \cos \phi}$$

where $a$ is one-half the major axis of an ellipse, $c$ is one-half the distance between foci, $\phi$ is the angle between the major axis and any point on the ellipse, and $r$ is the distance between a focus and any point on the ellipse; means coupling said rotational signal to said cursor bearing control means; and means coupling said signal proportional to $r$ to said range strobe signal generating means.

3. The combination of claim 2 wherein there is further provided: means to provide a signal proportional to a reference angle; and means operative to combine said reference angle signal with said rotational signal for application to said cursor bearing control means.

4. The combination of claim 3 wherein there is further provided: second means operative to provide signals proportional to the elapsed time between receipt of direct and echo signals at said sonobuoy from another explosive charge; second means coupled to said electronic plotter operative to provide a signal proportional to the distance between said sonobuoy and said other charge; second elliptical computing means including second means operative to provide a rotational signal; said second elliptical computing means coupled to be energized by signals from each of the above recited second means operative to provide a signal proportional to $r$ as a function of $\phi$ of an ellipse having said sonobuoy and the other charge as foci thereof means coupling the rotational signal from said second means to said cursor bearing control means; and means coupling said signal proportional to $r$ from said second elliptical computer to said range strobe signal generating means.

5. The combination of claim 4 wherein there is further provided: second means operative to provide a signal proportional to a reference angle, and means operative to combine said second reference angle signal with said second rotational signal for application to said cursor bearing control means.

6. Apparatus for use in airborne anti-submarine warfare comprising: means operative to provide signals proportional to the elapsed time between receipt of direct and echo signals at a selected air-dropped sonobuoy from an air-dropped explosive charge, said elapsed time being herein designated $2a-2c$; means operative to provide a signal proportional to the distance between said selected sonobuoy and said charge, said distance being herein designated $2c$; elliptical computing means including means operative to provide a rotational signal, herein designated $\phi$; said elliptical computing means coupled to be energized by said signals proportional to $2a-2c$, $2c$, and $\phi$ operative to provide a signal proportional to $$r = \frac{(a-c)(a+c)}{a-c \cos \phi}$$

where $a$ is one-half the major axis of an ellipse, $c$ is one-half the distance between foci, $\phi$ is the angle between the major axis and any point on the ellipse, and $r$ is the distance between a focus and any point on the ellipse; first and second output terminal means; means coupling said rotational signal to said first output terminal means; and means coupling said signal proportional to $r$ to said second output terminal means.

7. The combination of claim 6 wherein there is further provided: means operative to provide a signal proportional to a reference angle, and means operative to combine said reference angle signal with said rotational signal for application to said first output terminal means.

8. The combination of claim 7 wherein there is further provided: second means operative to provide a signal proportional to the elapsed time between the receipt of direct and echo signals at said sonobuoy from another explosive charge; second means operative to provide a signal proportional to the distance between said sonobuoy and said other charge; second elliptical computer means including second means operative to provide a rotational signal; said second elliptical computing means coupled to be energized by signals from each of the above recited second means operative to provide a signal proportional to $r$ as a function of $\phi$ of a second ellipse having said sonobuoy and said other explosive charge as foci; third and fourth output terminal means; means coupling said second rotational signal to said third output terminal means; and means coupling said signal proportional to $r$ from said second elliptical computing means to said fourth output terminal means.

9. The combination of claim 8 wherein there is further provided: means operative to provide a signal proportional to a second reference angle, and means operative to combine said second reference angle signal with said second rotational signal for application to said third ouput terminal means.

10. An elliptical computing system comprising: first means operative to generate a signal proportional to $a-c$, where $a$ is one-half the length of the major axis of an ellipse and $c$ is one-half the distance between foci; second means operative to provide a signal proportional to $c$; third means operative to provide a rotational signal proportional to $\phi$, where $\phi$ is the angle between the major axis of the ellipse and any point thereon; fourth means coupled to said first and second means operative to provide a signal proportional to $a+c$, fifth means coupled to said first, second, and third means operative to provide a signal proportional to $a-c$ cosine $\phi$, and bridge circuit means coupled to said first, fourth, and fifth means operative to provide a signal proportional to $r$, where $r$ is the distance between a focus of said ellipse and any point thereon, and where $$r = \frac{(a-c)(a+c)}{a-c \cos \phi}$$

11. The combination of claim 10 wherein there is further provided: means to provide a signal proportional to a reference angle, and combining means coupled to said last mentioned means and to said third means.

No references cited.

CHESTER L. JUSTUS, *Primary Examiner.*